United States Patent [19]
Bott

[11] 3,779,316

[45] *Dec. 18, 1973

[54] SECONDARY RECOVERY OF PETROLEUM
[75] Inventor: Lawrences L. Bott, Oak Park, Ill.
[73] Assignee: Nalco Chemical Company, Chicago, Ill.
[ * ] Notice: The portion of the term of this patent subsequent to Mar. 19, 1990, has been disclaimed.
[22] Filed: Dec. 2, 1971
[21] Appl. No.: 204,322

[52] U.S. Cl.............. 166/276, 166/278, 166/305 R
[51] Int. Cl............................................. E21b 43/02
[58] Field of Search.................. 166/275, 276, 278, 166/279, 300, 305

[56] References Cited
UNITED STATES PATENTS
3,721,295  3/1973  Bott.................................. 166/294
3,416,601  12/1968  Young et al........................ 166/276
2,356,254  8/1944  Blair, Jr. et al.................. 166/305 R
3,540,532  11/1970  Davis, Jr. et al.................. 166/275

Primary Examiner—Marvin A. Champion
Assistant Examiner—Jack E. Ebel
Attorney—John G. Premo et al.

[57] ABSTRACT

This invention relates to the secondary recovery of petroleum, and in particular, involves a process for reducing the amount of water recovered from a producing well in a water flooding process for recovering petroleum from a subterranean oil-bearing formation. This reduction in water is accomplished by introducing a stable liquid dispersion of a water soluble anionic vinyl addition polymer and a water soluble cationic polymer.

5 Claims, No Drawings

SECONDARY RECOVERY OF PETROLEUM

INTRODUCTION

The technique of water flooding to recover crude oil from subterranean formations is well known and is described in U. S. Pat. Nos. 2,827,964 and 3,399,725. This process involves injecting an aqueous flooding medium into the oil-bearing formation through an input well penetrating the formation. This provides the energy and flushing action necessary to force oil remaining within the formation into nearby output wells penetrating the same formation. The efficiency of such a recovery process will vary with the heterogeneity of the formation, i.e., variability in the permeability of the formation, and the viscosity of the oil to be displaced.

It has generally been considered uneconomical to employ water-flooding techniques to recover high viscosity oils. The wide difference between the viscosity of the residual oil and the viscosity of the water or brine flooding media results in poor recovery efficiency. When this difference is great enough, an aqueous flooding medium will tend to "finger" through the high viscosity oil and thereby bypass most of the available oil. The problem of obtaining efficient oil recovery is further aggravated by the fact that there are virtually no oil-bearing formations of uniform permeability. Rather, the typical oil-bearing formation consists of multiple layers of rock having different and often widely varying permeabilities relative to aqueous or oil liquid flow. There are many pockets or channels in the subterranean formation. These channels are merely cracks or disuniformities in the rock structure. They can be characterized as being paths of very low resistance to flow.

In such instances, it is apparent that a flooding medium will tend to selectively follow the course of least resistance, e.g., a zone of high permeability, and thus quickly penetrate and bypass the oil. Under these adverse conditions, the producing wells are soon producing so much of the flooding medium in relation to oil that the secondary recovery process can no longer by operated economically.

Most of these problems have been avoided by the addition of viscosity-increasing agents to the flooding medium. Fatty acid soaps, aliginates, sucrose, glycerine, carboxymethylcellulose, and water-soluble polymers such as polyvinyl alcohols, polyallyl alcohols and hydrolyzed polyacrylamides have been suggested for use as agents in aqueous flooding medium. The addition of these agents increased the viscosity of the flooding medium. This increased viscosity flooding medium, when injected into the subterranean formation at the input well, tends to plug the channels. The fact that the channels of high permeability are blocked results in the flooding medium being forced to pass through the oil containing formations, thus increasing the amount of oil extracted, and resulting in a more uniform hydrostatic face. However, these techniques have been found to be inadequate. The introduction of these viscosity-increasing agents is quite satisfactory in blocking and plugging up channels in the initial sections of the formation nearest the input well. As the flooding medium is forced further along in the formation it tends to become diluted by water which is found throughout the formation. In addition, the viscosity increasing additives tend to be lost in the reservoir "rock" surface. As a result of this dilution, the blocking or plugging ability of the flooding medium is diminished until at some point in the formation the flooding medium has been so diluted that it no longer blocks the channels at all.

The present invention is based upon the discovery that a stable liquid dispersion of a water-soluble anionic vinyl addition polymer and a water-soluble cationic polymer can be injected into a producing well which penetrates the formation, the result being that the channels in the area surrounding the producing well, as well as the inner portions of the subterranean formation are plugged with a polymeric substance. This phenomenon is due to the fact that the stable liquid dispersion containing the water-soluble anionic vinyl addition polymer and water soluble cationic polymer is capable of being inverted in water whereby the water-soluble vinyl addition polymer is released into water as a solution. This results in an uniformly viscous solution throughout the formation without the dilution and adsorption problems of the prior art.

The consequences of this procedure will cause increased produced oil to water ratios for a certain volume of water sent through the subterranean formation. Thus, the total amount of water needed to be sent through the formation will be reduced.

OBJECTS

It is an object of this invention to increase the oil to water ratio in the secondary recovery of oil from subterranean formations.

It is also an object of this invention to provide a stable liquid dispersion of a water-soluble anionic vinyl addition polymer and a water-soluble cationic polymer, which stable liquid dispersion is capable of being inverted in water whereby the polymer is released into water as a solution for recovering petroleum from a subterranean oil-bearing formation.

Further objects will appear hereinafter.

THE INVENTION

This invention relates to a process for reducing the amount of water removed from a producing well of a water flooding process for recovering petroleum from a subterranean oil-bearing formation which comprises introducing a stable liquid dispersion of a water-soluble anionic vinyl addition polymer and a water-soluble cationic polymer into a producing well which penetrates the formation. The stable liquid dispersion is characterized as capable of being inverted in water and the anionic vinyl addition polymer instantaneously reacts with the cationic polymer to produce a reaction product which may be described as a three-dimensional water and hydrocarbon liquid insoluble gel-like structure.

As mentioned above, the stable liquid dispersion is pumped into the producing or output well. Once in the formation and upon contact with the water in the formation, the stable liquid dispersion is inverted and the polymers react as described above to form the gel-like structure. This structure is by nature oleophilic, and resists passage of aqueous fluids but promotes oil flow through the treated formation.

The stable liquid dispersion is generally prepared by diluting a dispersion concentrate with an organic liquid. The dispersion concentrate is a water-soluble anionic vinyl addition polymer in the form of a water-in-oil emulsion which contains dispersed therein the finely-divided water-soluble anionic vinyl addition polymer. This dispersion concentrate contains uniformly distributed therethroughout a water-soluble cationic polymer. The water-soluble anionic vinyl addition polymers that are used in the practice of the invention may be illustrated by the following list of polymers:

TABLE I

| Number | Name |
|---|---|
| 1 | Polyacrylic acid-sodium salt |
| 2 | Polymethacrylic acid-sodium salt |
| 3 | Maleic anhydride-vinyl acetate copolymer |
| 4 | Polyvinyl methyl ether-maleic anhydride copolymer |
| 5 | Methacrylic acid-acrylamide copolymer |
| 6 | Polyacrylic acid |
| 7 | Isopropenyl acetate-maleic anhydride sodium salt |
| 8 | Itaconic acid-vinyl acetate |
| 9 | Methyl styrene-maleic anhydride sodium salt |
| 10 | Styrene-maleic anhydride |
| 11 | Methylmethacrylate-maleic anhydride sodium salt |
| 12 | Acrylic acid-styrene |
| 13 | Acrylamide-acrylic acid (5% by weight) |
| 14 | Acrylamide-acrylic acid (50% by weight) |
| 15 | Polystyrene sulfonic acid |
| 16 | Acrylamide-acrylic acid (80% by weight) |

The above polymers may vary in molecular weight. They may be as low as 10,000 or as high as 12,000,000 or more. In many of the more useful applications, which will be more fully discussed hereafter, the molecular weight will be greater than 1,000,000.

The invention contemplates using as preferred water-soluble anionic vinyl addition polymers the homo- and copolymers of acrylic acid as well as the water-soluble salts thereof.

THE WATER-SOLUBLE CATIONIC POLYMERS

These polymers also may be selected from a wide variety of known polymeric materials. Several of these polymers are listed below in TABLE II.

TABLE II

| Number | Name |
|---|---|
| 1 | Ethylene dichloride-ammonia condensation polymers |
| 2 | Tetraethylene pentamine-epichlorohydrin condensation polymers |
| 3 | Epichlorohydrin-ammonia condensation polymers |
| 4 | Polyethylene imine |
| 5 | Ethylene diamine |
| 6 | Polydiallyl amine |
| 7 | Dimethylamino ethyl methacrylate |
| 8 | The methyl chloride quaternary of Number 1 |
| 9 | The benzol chloride quaternary of Number 7 |
| 10 | Guanidine formaldehyde condensation polymers |
| 11 | Acrylamide-diallylamine (30%) |

The above polymers are illustrative of typical water-soluble cationic polymeric materials that may be used in the practices of the invention. A preferred class of these polymers may be described as alkylene polyamines which are illustrated by polymers 1, 2, 3, 4, 5 and 8 above.

Many of the above polymers have been described with respect to the reactants from which they are prepared. A detailed discussion of the above polymers and other cationic polymers appears in Canadian Pat. No. 731,212, the disclosure of which is incorporated herein by reference. The polymers may be employed as solutions or in the form of a water-in-oil latex emulsion. When the polymers are of the vinyl addition type they may be copolymers of other ethylenically saturated monomers. Such copolymers should contain at least 5 percent by weight of the cationic monomer.

THE ANIONIC VINYL ADDITION POLYMER POLYMERIC LATEX

The invention contemplates utilizing the water-soluble anionic vinyl addition polymers in the form of water-in-oil emulsion which contains dispersed therein the water-soluble anionic vinyl addition polymer. Emulsions of this type are prepared by dispersing the anionic vinyl addition polymer into a water-in-oil emulsion. These polymers as produced by most manufacturing processes are in the form of powders or lump-like agglomerates of varying particle size. It is desirable that the particles, before being placed into the emulsion, be comminuted by grinding, abrading or the like so that their average particle size is less than 5 millimeters and preferably is within the range of 1 to 5 microns. After the powders have been comminuted, they may be dispersed into the water-in-oil emulsion by means of agitation provided by such devices as stirrers, shakers and the like. To be commercially practical, the amount of polymer in the emulsion should be at least 2 percent by weight. The invention contemplates using emulsions containing between 5 to 75 percent by weight with preferred emulsions having a polymer concentration within the range of 10 to 45 percent by weight. In some cases the starting emulsions are converted to suspensions due to the nature and the amount of the polymer present therein.

From a commercial standpoint it is beneficial that the polymer emulsions thus described be stable, yet at the same time contain relatively large amounts of polymers. One method of insuring that the polymers do not precipitate when dispersed in the emulsion is that the particle size of the polymer be as small as possible. Thus polymers dispersed in the emulsifiers are quite stable when the particle size is within the range of 5 millimicrons up to about 5 microns. To produce particle sizes within these limitations, spray dryers with appropriate size nozzles may be used. It also is possible to prepare the polymer-containing emulsion of the water-soluble vinyl addition polymers directly from the vinyl monomers from which these polymers are synthesized. Such polymer-containing emulsions may be synthesized by using the water-in-oil emulsion polymerization technique set forth in U. S. Pat. No. 3,284,393. The teachings of this patent comprises forming a water-in-oil emulsion of water-soluble ethylenic unsaturated monomers. The emulsion is formed by utilizing a water-in-oil emulsifying agent. To this monomer is added a free radical-type polymerization catalyst and the heat is applied under free radical-forming conditions to form water-soluble polymer latices. The polymeric latices produced by this patent are relatively unstable and frequently must be treated with additional emulsifiers to render the products stable.

The water-in-oil emulsions used to prepare the above polymers may be formulated by any number of known techniques.

The oils used in preparing these emulsions may be selected from a large group of organic liquids which include liquid hydrocarbons and substituted liquid hydrocarbons.

A preferred group of organic liquids are the hydrocarbon liquids which include both aromatic and aliphatic compounds. Thus, such organic hydrocarbon liquids as benzene, xylene, toluene, mineral oils, kerosenes, naphthas and, in certain instances, petrolatums may be used. A particularly useful oil from the standpoint of its physical and chemical properties is the branch-chain isoparaffinic solvent sold by Humble Oil and Refining Company under the Tradename "ISOPAR M." Typical specifications of this narrow-cut isoparaffinic solvent are set forth below in TABLE III.

TABLE III

| Specification Properties | Minimum | Maximum | Test Method |
|---|---|---|---|
| Gravity, API at 60/60°F. | 48.0 | 51.0 | ASTM D 287 |
| Color, Saybolt | 30.0 | | ASTM D 156 |
| Aniline Point, °F. | 185.0 | | ASTM D 611 |
| Sulfer, ppm | | 10.0 | ASTM D 1266 (Nephelometric mod.) |
| Distillation, °F. | | | ASTM D 86 |
| IBP | 400.0 | 410.0 | |
| Dry Point | | 495.0 | |
| Flash point, °F. (Pensky-Martens closed cup) | 160.0 | | ASTM D 93 |

The amount of oil used in relation to the water to prepare the emulsion may be varied over wide ranges. As a general rule, the amount of oil-to-water may vary between 5:1 to 1:10 with preferable emulsions being prepared in the ratio of 1:2 to 1:10. These ratios are illustrative of emulsions that can be prepared, although it should be understood that the invention is not limited thereby.

The emulsions may be prepared by any number of techniques. For example, the emulsions may be prepared by using high speed agitation or ultrasonic techniques. In most instances, however, it is desirable that the emulsion be a stable emulsion and to achieve this end it is often necessary to employ an oil soluble emulsifying agent. The amount of emulsifying agent to provide an emulsion will have to be determined by routine experimentation. As a general rule it may be said that the amount of oil soluble emulsifier may range from 0.1 to 30 percent by weight based on the weight of the oil. To produce stable emulsions the amount of emulsifier will normally be within the range of 12 to 20 percent by weight of the oil.

Rather than provide a listing of suitable emulsifiers, recommended as being satisfactory are the so-called low HLB materials which are well documented in the literature and are summarized in the Atlas HLB Surfactant Selector. Although these emulsifiers are useful in producing good water-in-oil emulsions, other surfactants may be used as long as they are capable of producing these emulsions. For instance, we have found that certain high HLB surfactants are capable of producing stable water-in-oil emulsions. A typical low HLB emulsifier is sorbitan monooleate.

PREPARATION OF THE DISPERSION CONCENTRATE

Once the latices containing the water-soluble anionic vinyl addition polymers are prepared, the dispersion concentrate is prepared by combining them with the water-soluble cationic polymers by the utilization of conventional mixing techniques. Preferably the water-soluble cationic polymers are in the form of aqueous solutions which contain 5 to 40% by weight of the polymer and are added to the polymeric latex. Alternatively, they may be nearly water-free. After uniformly mixing the two components there results a dispersion concentrate of a water-soluble anionic vinyl addition polymer and a water-soluble cationic polymer. The proportions of the two polymers may be varied to a considerable degree. For instance, the ratio of the water-soluble anionic vinyl addition polymer to water-soluble cationic polymer may vary between 1:10 to 10:1 on a weight basis. A preferred ratio is 1:5 to 5:1. The most preferred ratio is 1:2 to 2:1.

The amount of the water-soluble vinyl addition polymers plus the water-soluble cationic polymers present in the finished dispersion concentrate may be varied over a wide range of concentrations, e.g. dispersion concentrates containing from 0.001 to 75 percent by weight are useful, although for most applications the total weight of the two polymers contained in the dispersion concentrate will be within the range of 5 to 40 percent by weight, with a very beneficial dispersion being one which contains between 10 to 30% by weight of the two polymers.

The finished dispersion concentrates are stable at room temperature for periods of time ranging between several days to as long as six months since they may be prepared over a wide variety of concentrations. Dispersion concentrates containing large amounts of polymers may be prepared and shipped to a use point and then diluted with an organic liquid just prior to use.

To illustrate the preparation of dispersion concentrates, a variety of emulsions were prepared containing different water soluble anionic vinyl addition polymers. These emulsions are set forth below in TABLE IV.

TABLE IV

| Composition number | Water (% by weight) | Oil (% by weight) | Polymer | Percent in emulsion | Polymer particle size range |
|---|---|---|---|---|---|
| I | 72 | 28(I) | 93% acrylamide, 7% methacrylic acid | 35 | 0.05–7.0 microns. |
| II | 72 | 28(I) | 93% acrylamide, 7% methacrylic acid | 35 | 0.05–7.0 microns. |
| III | 72 | 28(T) | 70% acrylamide, 30% acrylic acid | 35 | 0.05–7.0 microns. |
| IV | 67 | 33(I) | 93% acrylamide, 7% methacrylic acid | 32 | < 30 microns. |
| V | 70 | 30(I) | 70% acrylamide, 30% acrylic acid | 34 | .01–10 microns. |
| VI | 71 | 29(I) | Sodium Polyacrylate | 37 | < 1 mm. |

I = Isopar M.
T = Toluene.

DISPERSION CONCENTRATE A

To emulsion in TABLE IV, COMPOSITION NUMBER VI, there was added 30 percent by weight of an aqueous dispersion containing 23 percent by weight of an alkylene polyamine prepared from the condensation of ethylene dichloride and ammonia. The polymer was prepared using the techniques set forth in Canadian Pat. No. 785,829.

DISPERSION CONCENTRATE B

To COMPOSITION NUMBER VI in TABLE IV, there was added an aqueous dispersion which contained 25 percent by weight of an ammonia ethylene dichloride polymer of the type used in DISPERSION A above, with the exception it had been quaternized with methyl chloride.

To illustrate other novel dispersion concentrates of the invention TABLE V is presented below:

TABLE V

| Dispersion | Anionic Latex Table IV | % by Weight | Cationic Polymer | % by Weight |
|---|---|---|---|---|
| C | I | 60 | 20% solution of a tetraethylene pentamine epichlorohydrin reaction product (Canadian Pat. 731,212) | 40 |
| D | VI | 50 | Ethylene diamine | 10 |
| E | V | 70 | 75% acrylamide, 25% di-methylamino ethyl methacrylate copolymer in the form of a latex (water-in-oil) — See TABLE II, U. S. 3,624,019 | 30 |

All of the above dispersion concentrates were stable and were capable of being stored under a variety of conditions without inter-reaction of the two polymers.

THE ORGANIC LIQUID

Generally, the dispersion concentrate will be diluted with an organic liquid just prior to use. As mentioned above, the preferred dispersion concentrate will have from 5 to 40 percent by weight of the two polymers. In this application, the dispersion concentrate will be diluted with the organic liquid so that the stable liquid dispersion will have 0.001 to 10 percent by weight of the two polymers.

The dispersion concentrate can be diluted with the organic liquid (including crude oil) near the location of the well where it is to be used. This on-site dilution procedure may be performed in a mixing tank near the well location and then be pumped directly into the well. The organic liquids of this invention include both aromatic and aliphatic hydrocarbon compounds. Thus, such organic hydrocarbon liquids as benzene, xylene, toluene, mineral oils, kerosene, naphthas and petroleums may be used. In particular, the petroleum recovered from the primary recovery operation (crude oil) may be used to dilute the dispersion concentrate for use. The use of petroleum obtained from the primary recovery operation eliminates the burdensome problems in handling other organic liquids but also results in a great decrease in cost.

Oftentimes it is desirable to use a more concentrated flooding medium than the ones as defined above. If such is the case, the dispersion concentrate may be used without dilution with an organic liquid. If such is the case the polymeric latex concentrate would be pumped directly into the well without any type of dilution.

INVERSIONS OF THE STABLE LIQUID DISPERSION

One of the most interesting phenomenon that occurs in working with the above described anionic latices is the fact that under certain conditions the emulsion, which contains dispersed therein the finely-divided water-soluble anionic vinyl addition polymers, may be inverted.

The water-soluble anionic vinyl addition polymer-containing emulsions may be inverted by any number of means. The most convenient resides in the use of a surfactant added to either the polymer-containing emulsion or to the water into which it is to be dissolved. The placement of a surfactant into the water causes the emulsion to rapidly invert and release the polymer in the form of an aqueous solution. When this technique is used to invert the polymer-containing emulsion the amount of surfactant present in the water may vary over a range of 0.01 to 50 percent based on polymer. Good inversion often occurs within the range of 1.0 to 10 percent based on polymer.

The preferred surfactants are hydrophilic and are further characterized as being water soluble. Any hydrophilic-type surfactant such as ethoxylated nonyl phenols, ethoxylated nonyl phenol formaldehyde resin, dioctyl esters of sodium sulfosuccinate, and octyl phenol polyethoxy ethanol can be used.

Other surfactants that may be employed include the soaps such as sodium and potassium myristate, laurate, palmitate, oleate, stearate, resinate, and hydroabietate, the alkali metal alkyl or alkylene sulfates, such as sodium lauryl sulfate, potassium stearyl sulfate, the alkali metal alkyl or alkylene sulfonates, such as sodium lauryl sulfonate, potassium stearyl sulfonate, and sodium cetyl sulfonate, sulfonated mineral oil, as well as the ammonium salts thereof; and salts of higher means like lauryl amine hydrochloride, and stearyl amine hydrobromide.

Any anionic, cationic or nonionic compound can be used as the surfactant.

In addition to using the water soluble surfactants described above, other surfactants may be used such as silicones, clays and the like which are included as surfactants since, in certain instances, they tend to invert the emulsion even though they are not water-soluble.

In other specific cases the surfactant may be directly added to the polymer-containing emulsion; thereby rendering it self-inverting upon contact with water. These products, while capable of being used in certain systems, must be carefully formulated since the surfactants may tend to interact with the emulsifier or the emulsion and destroy it prior to its being used.

The emulsions may be inverted by treating them with aqueous solutions of alkaline materials such as solutions of sodium hydroxide, ammonia, amines, sodium aluminate or the like.

Other techniques for inverting the emulsions include the use of agitation, high voltage electrical fields, heat and pH shift, as well as the placement into the water, into which the polymer-containing emulsion is to be dissolved, certain electrolytes. For any particular polymer-containing emulsion a suitable method for its inversion may be readily determined by routine experimentation.

THE GEL-LIKE STRUCTURES

When the stable liquid dispersions are thus inverted the anionic vinyl addition polymer instantly reacts with the cationic polymer to produce within a matter of minutes a reaction product which may be described as a three-dimensional, water and hydrocarbon liquid insoluble gel-like structure, which is composed of what is believed to be ionically combined intimate admixture of the two polymers. These gel-like structures are spongy, porous, and are substantially incapable of adherence to most hydrophobic surfaces.

EXAMPLES

When the water-in-oil emulsions are injected into producing walls they have a high water to oil output ratio, generally resulting from many years of secondary recovery operations, it is possible to greatly improve the amount of oil produced in relation to the water recovered.

For instance, when the water-in-oil emulsions would be used to treat typical produced fluid from, for instance, a West Texas water flooding field improvements in the amount of oil produced will range from between 20 to as high as 40 percent by weight.

Specifically, when the water-in-oil emulsions of the invention are used typical results that would be obtained are set forth in Table VI below. Typical of the dilutions used are injection fluid which is composed of 95 percent crude oil, 4 percent water, 1 percent polymer. The results shown in Table VI would be obtained on dispersion concentrates A through E, as described above, after continuous injection would be made into the producing wells over a 1 to 5 week period.

TABLE VI

| Example No. | Dispersion concentrate | Percent concentrate by weight | Organic liquid | Percent organic liquid by weight | Percent increase in oil produced |
|---|---|---|---|---|---|
| 1 | A | 5 | Crude oil | 95 | 35 |
| 2 | B | 10 | do | 90 | 20 |
| 3 | C | 3 | do | 97 | 21 |
| 4 | D | 5 | do | 95 | 40 |
| 5 | E | 5 | do | 95 | 38 |

While the invention has been described with respect to producing wells of water flooding processes, such is intended to include primary production wells which produce crude oil and water. The invention is of particular importance where the produced fluid has a high water ratio. It is not unusual to find primary wells producing 100 barrels of brine for each 5 to 10 barrels of crude oil. Depending upon the geological and chemical nature of the producing "rock" formation, along with the proper choice of polymers, exhibited; will be exhibited; i.e., reduction in produced water.

I claim:

1. A process for reducing the amount of water removed from a producing well used for recovering petroleum from a subterranean oil-bearing formation which comprises the steps of introducing a stable liquid dispersion of a water-soluble anionic vinyl addition polymer and a water-soluble cationic polymer into a producing well which penetrates said formation, said dispersion comprising a polymeric latex composed of a water-in-oil emulsion which contains dispersed therein a finely-divided water-soluble anionic vinyl addition polymer, said polymeric latex having uniformly distributed therethroughout a water-soluble cationic polymer with the weight ratio of polymeric latex to water-soluble cationic polymer being within the range of 1:10 to 10:1 and the total amount of polymeric latex plus water-soluble cationic polymer present within said dispersion being within the range of from 0.001 to 75 percent by weight and then inverting said dispersion within the subterranean formation whereby a three dimensional, water and hydrocarbon liquid insoluble gel-like structure is produced.

2. The process of claim 1 wherein the stable liquid dispersion is comprised of a polymeric latex composed of a water-in-oil emulsion which contains dispersed therein a finely-divided polyacrylic acid or a water-soluble salt thereof, said polymeric latex having uniformly distributed therethroughout a water soluble alkylene polyamine polymer with the weight ratio of polymeric latex to water-soluble cationic polymer being within the range of 1:10 to 10:1 and the total amount of polymeric latex plus water-soluble cationic polymer present within said dispersion being within the range of from 0.001 to 75 percent by weight and the dispersion is inverted by means of a surfactant.

3. The process of claim 1 wherein the stable liquid dispersion has a weight ratio of polymeric latex to water-soluble cationic polymer within the range of from 1:5 to 5:1 and the amount of polymeric latex plus water-soluble cationic polymer present within said dispersion is within the range of from 5 to 40 percent by weight and the dispersion is inverted by means of a surfactant.

4. The process of claim 1 wherein the stable liquid dispersion has a weight ratio of polymeric latex to water-soluble cationic polymer within the range of from 1:2 to 2:1 and the amount of polymeric latex plus water-soluble cationic polymer present within said dispersion is within the range of from 10 to 30 percent by weight and the dispersion is inverted by means of a surfactant.

5. The process of claim 1 where the water-soluble anionic polymer is polyacrylic acid or its water-soluble salts and the water-soluble cationic polymer is an alkylene polyamine polymer and the dispersion is inverted by means of a surfactant.

* * * * *